US011603315B2

(12) United States Patent
Mazyck et al.

(10) Patent No.: US 11,603,315 B2
(45) Date of Patent: Mar. 14, 2023

(54) WATER-RESISTANT AND HIGH STRENGTH CARBON PRODUCTS

(71) Applicant: Carbonxt, Inc., Gainesville, FL (US)

(72) Inventors: David W. Mazyck, Gainesville, FL (US); Regina Rodriguez, Gainesville, FL (US)

(73) Assignee: Carbonxt, Inc., Gainesville, FL (US)

( * ) Notice: Subject to any disclaimer, the term of this patent is extended or adjusted under 35 U.S.C. 154(b) by 144 days.

(21) Appl. No.: 17/145,009

(22) Filed: Jan. 8, 2021

(65) Prior Publication Data

US 2022/0024765 A1 Jan. 27, 2022

Related U.S. Application Data

(60) Provisional application No. 62/945,426, filed on Dec. 9, 2019.

(51) Int. Cl.

*C01B 32/05* (2017.01)
*B01J 20/20* (2006.01)
*B01D 53/02* (2006.01)

(52) U.S. Cl.

CPC .............. *C01B 32/05* (2017.08); *B01D 53/02* (2013.01); *B01J 20/20* (2013.01)

(58) Field of Classification Search

CPC .... C09C 1/44; C09C 1/58; C09C 1/48; B01D 2258/0283; B01D 53/02; B01D 2257/302; B01D 2257/404; B01D 2253/102; B01D 2257/602; B01J 20/28019; B01J 20/2803; B01J 20/3042; B01J 20/28011; B01J 20/20; B01J 20/3007; B01J 20/3078; B01J 20/3085; C01B 32/05

See application file for complete search history.

(56) References Cited

U.S. PATENT DOCUMENTS 3,320,080 A 5/1967 Mazzarella et al.
3,719,514 A 3/1973 Taylor
4,298,729 A 11/1981 Cheng et al.
4,518,704 A 5/1985 Okabayashi et al.
4,677,086 A 6/1987 McCue et al.
4,866,023 A 9/1989 Ritter et al.
5,242,470 A 9/1993 Salter et al.
5,304,527 A 4/1994 Dimitri
5,389,325 A 2/1995 Bookbinder et al.
5,488,021 A 1/1996 DeLiso et al.
5,538,932 A 7/1996 Yan et al.
5,691,270 A 11/1997 Miller
5,736,485 A 4/1998 Miller
5,863,858 A 1/1999 Miller et al.
6,472,343 B1 10/2002 McCrae et al.
6,573,212 B2 6/2003 McCrae et al.
6,696,384 B2 2/2004 McCrae et al.
7,550,156 B2 6/2009 Gauthier et al.
8,691,722 B2 4/2014 Gadkaree et al.
2003/0022787 A1 1/2003 McCrae et al.
2006/0154815 A1 7/2006 Abe et al.
2009/0103983 A1 4/2009 Ghosh et al.
2010/0173772 A1 7/2010 Robinson et al.
2017/0120219 A1 5/2017 Diamond et al.
2018/0043329 A1* 2/2018 Mazyck ............... B01J 20/3007

FOREIGN PATENT DOCUMENTS

CN 107 974 558 A * 5/2018
DE 10 2004048559 A1 * 4/2006 ................ C10L 5/14
EP 0479487 A1 4/1992
JP 2006 271 966 A * 10/2006 ............. B01D 39/20
WO WO 94 00 382 A1 * 1/1994 ........... C01B 32/342
WO 2006037304 A1 4/2006
WO 2020112707 A1 6/2020
WO WO 2020 112 707 A1 * 6/2020 ........... C01B 32/318

OTHER PUBLICATIONS

International Preliminary Report on Patentability in International Application No. PCT/US2021/012770 dated Jun. 23, 2022, 13 pages.
"Standard Test Method for Ball-Pan Hardness of Activiated Carbon" ASTM Inernational (Jul. 7, 2011): pp. 1-4; p. 1 col. 1 para1, p. 1 col. 2 para 5.
Johs et al. "Dissolved organic matter reduces the effectiveness of sorbents for mercury removal" Science of the Total Environment, vol. 690 (Jul. 3, 2019): pp. 410-416; entire document, but especially: abstract, p. 412 col. 1 para 3.
"SediMite Spec Sheet" Sediment Solutions (Oct. 26, 2017): p. 1.
International Search Report and Written Opinion in International Application PCT/US21/12770, dated Apr. 7, 2021, 14 pages.

* cited by examiner

*Primary Examiner* — Timothy C Vanoy
(74) *Attorney, Agent, or Firm* — Berg Hill Greenleaf Ruscitti LLP

(57) ABSTRACT

A sorbent composition for pelletized carbon products having high strength and water resistance is disclosed. Also disclosed are methods of producing and using sorbent compositions of pelletized carbon products having higher strength and water resistance. Other embodiments include a system and method for removing contaminants from a process gas stream.

29 Claims, 3 Drawing Sheets

WATER-RESISTANT AND HIGH STRENGTH CARBON PRODUCTS

CROSS REFERENCE TO RELATED APPLICATIONS

This application claims the benefit of and priority to U.S. Provisional Application No. 62/945,426, filed Jan. 10, 2020. The entire specification and figures of the above-referenced application are hereby incorporated, in their entirety by reference.

FIELD OF THE INVENTION

This invention relates to sorbent compositions of pelletized carbon products, and more particularly, related to compositions and methods of making pelletized carbon products having high mechanical strength and water resistance.

BACKGROUND OF THE INVENTION

Without limiting the scope of the present invention, its background will be described in relation to methods and compositions of pelletized carbon products.

Early publications on pelletized carbon products depend on high temperature treatment to create strong and water-resistant carbon pellets with binders such as clays and resins. For instance, U.S. Pat. No. 4,518,704 employs clay binders at a 30-70% content and firing at about 1,100° C. U.S. Pat. Nos. 5,691,270 and 5,863,858 use bentonite clays and high temperature to create the desired hardness. U.S. Pat. No. 4,677,086 teaches that the calcination temperature of bentonite clay determines the water stability. To produce sorbents that maintain their hardness in water, the binder needs to be fired above 650° C. U.S. Pat. No. 5,736,485 describes the use of organic natural and synthetic resins at high temperatures. U.S. Pat. No. 8,691,722 makes use of both organic resins and clays for greater mechanical strength of the structure. However, their methods still require the products to be fired at 600-1500° C. to carbonize the organic binders and sinter the inorganic binder to produce a hardened structure.

Other publications focus on the use of plasticizers to help binders such as clays and resins form stronger and more stable bonds with the carbonaceous material and to lower heat treatment temperature requirements. For instance, U.S. Pat. No. 5,389,325 describes a water-resistant carbonaceous product employing phenolic resins and plasticizer. Similarly, U.S. Pat. No. 5,488,021 teaches using clay with a plasticizing organic binder to achieve strength at low temperatures. The patent also teaches the use of attapulgite clay instead of bentonite clay to produce a more water-resistant product. U.S. patent Ser. No. 14/793,595 teaches the use of a secondary inorganic binder, such as silica to improve the hardness of using a clay binder while employing lower heat treatment temperature requirements. However, since the scope of the invention relates to vapor-phase applications, water resistance of the finished product when submerged in water is not discussed.

Still other publications suggest the use of polymeric compounds as the main binder component with the use of other crosslinking agents and aids. For instance, U.S. Pat. No. 4,866,023 employs the use of a polymeric binder along with cations to produce water-insoluble salts that coat the shaped solids. U.S. Pat. Nos. 6,696,384, 6,573,212, and 6,472,343 make use of polymeric binders, namely CMC, along with crosslinking agents and pH modifiers in order to make a pelletized carbon product that achieves water stability and required strength while using low temperature processes.

Still other publications disclose creating pelletized carbon products without binders. For instance, U.S. Pat. No. 5,304, 527 makes use of a chemical activation process of lignocellulosic material to produce carbon structures strong enough to be used in vapor-phase applications. The activation process still requires temperatures of 450° C. to 600° C. Since the scope of the invention relates to vapor-phase applications, water resistance is not discussed.

The use of low-cost binders, such as starch, has been limited in the use of pelletized carbon products because of their soluble properties (i.e., not being water-resistant). In fact, U.S. Pat. No. 7,550,156 makes use of starch's soluble properties to create pharmaceutical products that will easily disintegrate in aqueous media.

U.S. Pat. No. 5,242,470 applies the use of starch as a binder to make coal pellets at low temperatures. However, the invention therein does not describe water resistance (or lack thereof) of the products since it was outside the scope of the invention. In contrast, U.S. Pat. Nos. 6,696,384, 6,573,212, and 6,472, 343 teach that a polymeric binder such as starch can be made water-resistant by using crosslinking agents and pH modifiers. However, the use of specialty chemicals as crosslinking agents would increase costs, especially when previous studies suggest using up to 5% crosslinking agent in the formulation.

Other references teach that starch and its derivatives can be made insoluble with some modifications. For instance, U.S. Pat. No. 3,320,080 make use of starch as water-resistant coating in paper products. The invention relies of making cationic starch insoluble by crosslinking with an etherification or esterification reaction. Likewise, U.S. Pat. No. 3,719, 514 makes use of anionic starch as a water-resistant coating on paper products. The starch in the process is made insoluble by adding carboxyl groups to the starch. U.S. Pat. No. 4,298,729 describes methods of making food products that are resistant to aqueous dissolution via the addition of a xanthan gum-modified starch. The xanthan gum-modified starch is made by preparing aqueous mixture of both additives, heating to just below 100° C. to gelatinize, then reducing the moisture to 10% before drying and heating between 138-176° C.

Other water-soluble compounds, such as lignosulfonate, have been used as binder components for carbonaceous products. U.S. Pat. No. 5,538,932 uses lignosulfonate as an "activatable" binder to produce vapor-phase carbon structures, thus the water resistance of such teachings is unknown. Furthermore, the patent describes use of the binder in temperatures above 450° C.

To reduce operating costs associated with high temperature treatment or expensive specialty chemicals, a need still exists for processes for making pelletized carbons with high mechanical strength and sufficient water resistance to allow them to be used in water phase applications.

SUMMARY OF THE INVENTION

The present invention disclosed herein is directed to methods and compositions of pelletized carbon products having high mechanical strength and water resistance. Products obtaining water resistance are defined as those capable of maintaining their mechanical strength even when submerged in water for use in water-phase applications.

In one embodiment, the present invention is directed at a pelletized carbon composition comprised of powdered carbonaceous material and two binders. In one aspect of this embodiment, the first binder is a soluble organic binder and the second binder can be chosen from the class of compounds of clay minerals or organic polymers. In another aspect of this embodiment, the first binder is starch while the second binder is bentonite clay. In yet another aspect, the first binder is starch while the second binder is lignosulfonate.

In another embodiment, the pelletized carbon composition is composed of up to 20% of one binder and of up to 20% of a second binder. In one aspect of this embodiment, the first binder is a soluble organic binder, and the second binder is a clay mineral or organic polymer. In another aspect of this embodiment, the pelletized carbon composition is composed of up to 20% starch and of up to 20% bentonite clay. In yet another aspect of this embodiment, the pelletized carbon composition is composed of up to 20% starch and of up to 20% lignosulfonate.

In yet another embodiment, the present invention is directed to a method of making pelletized carbon compositions, the method including mixing a powdered carbonaceous material, an organic binder, a secondary binder, and water, extruding the mixture into pelletized structures and drying to form pelletized carbon compositions. In one aspect of this embodiment, the amount of organic binder and secondary binder is up to 20% of the dry composition for each binder. In another aspect of this embodiment, the amount of water added is just enough to plasticize the mixture. In yet another aspect of this embodiment, the water may contain a pH modifier solution. In one aspect, the pH modifier solution is sodium hydroxide.

Considering the foregoing features of the invention, in a first aspect, it may be considered a pelletized carbon composition, comprising powdered carbonaceous material, an organic binder, and a secondary binder.

According to a second aspect of the invention, it may be considered a method of making pelletized carbon compositions, the method comprising: mixing a powdered carbonaceous material, an organic binder, a secondary binder, and water; extruding the mixture into pelletized structures; and drying the pelletized structures to form pelletized carbon compositions.

According to a third aspect of the invention, it may be considered a pelletized carbon composition, comprising: a powdered carbonaceous material, an organic binder, a secondary binder, sodium hydroxide and water wherein said sodium hydroxide and said water neutralize acidity of said powdered carbonaceous material thereby enabling said organic binder and said secondary binder to form a water-resistant bond.

There are a number of optional features of the invention that may be adopted for the above-described aspects of the invention. With respect to the first aspect of the invention, the following are included within said optional features, and at least some of these also are included for the third aspect. Specifically, these optional features include: wherein the organic binder is a soluble organic binder; wherein the organic binder is starch; wherein the secondary binder is a clay mineral; wherein the secondary binder is attapulgite clay; wherein the secondary binder is an organic polymer; wherein the secondary binder is lignosulfonate; wherein the organic binder comprises up to 20% of the composition; wherein the secondary binder comprises up to 20% of the composition; wherein the secondary binder is bentonite clay; wherein the pelletized carbon composition is composed of up to 20% of the organic binder and up to 20% of the secondary binder; wherein the organic binder is a soluble organic binder and the secondary binder is a clay mineral or organic polymer; wherein the organic binder is starch and the composition is composed up to 20% the starch; wherein the secondary binder is bentonite clay and the composition is composed up to 20% the bentonite clay; wherein the organic binder is starch and the composition is composed of up to 20% the starch; wherein the secondary binder is lignosulfonate and the composition is composed up to 20% the lignosulfonate; and wherein the pelletized carbon composition further includes sodium hydroxide and water to neutralize acidity of the powdered carbonaceous material enabling said organic binder and said secondary binder to form a water resistant bond.

In yet other embodiments of the invention, it is directed to a method and system utilizing pelletized carbon products having high mechanical strength and water resistance for controlling multiple pollutants within a process gas stream. The pelletized carbon products may be introduced to the process gas stream in a number of ways to include, without limitation, the pelletized carbon products housed in a packed bed through which the process gas may pass or the pelletized carbon products installed in a fixed location in a conduit system of the process gas.

While the invention is summarized herein as having multiple embodiments, it should be understood that the invention is not strictly limited to these embodiments. The scope of the invention must be considered by evaluating the appended claims and the various combinations and subcombinations that may be claimed.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not limit the scope of the present invention.

Described herein are embodiments for pelletized carbon products having high mechanical strength and water-resistant properties.

According to the invention, soluble organic binders can be used to create water-resistant carbon products with high mechanical strength. Soluble organic binders, such as starch, can be made water-resistant by crosslinking the binders with clay minerals or organic polymers. Efforts have been made with respect to soluble organic binders, such as starch, to make the binders water-resistant through chemical modifications of the soluble organic binder or by crosslinking the soluble organic binder with specialty chemicals. In contrast, the present invention provides a low-cost, easily available crosslinking alternatives with clay minerals and organic polymer byproducts. These alternative binding strategies allow the soluble organic binder to be used without any added chemical process or chemical alterations, thus reducing cost of production. Additionally, the use of clay minerals and organic polymer byproducts are easily available, low-cost options that are also more environmentally friendly than the use of specialty chemicals or complex chemical processes to alter the solubility of soluble organic compounds.

The present invention is not known or expected, since the use of starch as a binder yield products with low water resistance unless the starch is crosslinked with complex crosslinking agents or modified with esterification or etherification processes. Furthermore, the present invention is not known or expected, since the use of clay minerals and organic polymers, such as bentonite clay and lignosulfonates also yield products with low water resistance and low mechanical strength unless high temperature treatments are employed. Thus, in implementing the making of compounds according to the present innovation, it was discovered that combining starch and bentonite clay, for example, can create pelletized carbon products with high mechanical strength and water resistance but without requiring high temperature treatments.

According to the present invention in various embodiments, water-resistant and high strength carbon products are made with manufacturing methods that do not require high temperature treatments or complex chemical processes.

Figure 1:
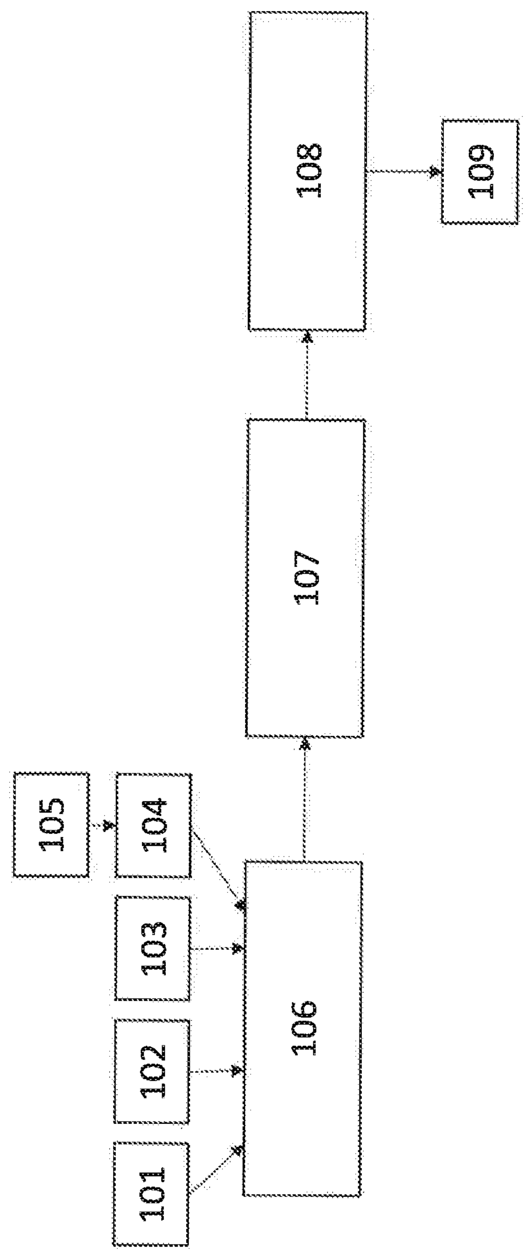
FIG. 1 is schematic diagram depicting a process for making pelletized carbon products.

Referring to FIG. 1, an embodiment of the present invention is schematically illustrated in which system 100 teaches a method for making pelletized carbon compositions of the present invention. System 100 includes the addition of raw materials including powdered carbonaceous material 101, an organic binder 102, a secondary binder 103, and water 104.

In one embodiment, the organic binder 102 may be starch. In another embodiment, the organic binder 102 comprises up to 20% of the finished product composition 109.

In another embodiment, the secondary binder 103 may be a clay mineral. In another embodiment, the clay mineral may be bentonite clay. In another embodiment, the secondary binder may be an organic polymer. In yet another embodiment, the secondary binder may be lignosulfonates. In yet another embodiment, the secondary binder 103 comprises up to 20% of the finished product composition 109.

In another embodiment, the amount of water 104 added is sufficient to provide the required plasticity for the mixture. In embodiments of the present invention, the powdered carbonaceous material 101 may be acidic in character. In implementing embodiments of the present invention, it was discovered that powdered carbonaceous material 101 which is acidic in character do not allow the organic binder 102 and the secondary binder 103 to crosslink effectively into a water-resistant finished product composition. Thus, in implementing embodiments of the present invention, it was discovered that sufficient amounts of sodium hydroxide could be added to water 104 in order to neutralize the acidic powdered carbonaceous material 101 and to allow for the organic binder 102 and the secondary binder 103 to form a strong, water-resistant bond. Thus, optionally in an embodiment, a pH modifying agent, 105 may be added to water 104.

The raw materials 101, 102, 103, 104, and optionally 105 are added to a mixing device 106. Mixing device 106 is capable of mixing raw materials 101, 102, 103 104, and optionally 105 for any desirable amount of time sufficient to gain the required plasticity for extruding through extruder 107.

Preferably, extruder 107 forms or shapes the mixed material into cylindrical, spherical, square, or rectangular granules/pellets using an extruder, briquetting machine or pelletizer. In one embodiment, extruder 107 may be capable of forming said mixture material into cylindrical pellets through extrusion through a die and cutting the extruding material to produce pellets. The extrusion device may be any size die, capable of producing the desirable sized pellets.

The extruded material is conveyed to dryer 108. Dryer 108 is used to remove moisture and create final pelletized carbon compositions 109. Dryer 108 is operated at low temperatures up to 250° C.

In the examples that follow, pelletized carbon products cylindrical in shape with 4 mm diameter and 4 mm length were extruded with a pilot scale extruder. Extruded pellets were dried to below 2% moisture at 150° C. Pellet hardness of the finished pelletized carbon composition was determined using the ASTM D3802 for Ball Pan Hardness (BPH) of Activated Carbon. Finished pelletized carbon compositions were submerged in water for 24 hours to determine their water resistance. If the finished pelletized carbon compositions maintained their mechanical strength after submersion in water, then the product was deemed to be water-resistant. If the finished pelletized carbon compositions did not maintain their mechanical strength after submersion in water because the compositions dissolved into its individual powdered components, they were deemed to lack water resistance. If the finished pelletized carbon compositions maintained their pelletized shape while submerged in water but their mechanical strength was less than before being submerged in water, then these products were deemed to have partial water resistance.

EXAMPLE 1

Pelletized carbon products were produced per the binder compositions in Table 1. For the two products made with bentonite clay only, as the percent composition of the clay mineral increases, the mechanical strength of the product increases at the expense of a less activated carbon and thus less adsorption capacity of the pelletized carbon product. Furthermore, without heat treatment at high temperatures, the pelletized carbon products with bentonite clay as the only binder have no water resistance.

In contrast, the pelletized carbon product with the binder composition of the present invention (10% bentonite clay and 10% starch) shows that sufficient mechanical hardness can be attained and that a significant improvement in the water resistance of the product can also be achieved.

TABLE 1

| Binder composition | BPH | Water Resistance |
|---|---|---|
| 20% bentonite clay | 60 | none |
| 40% bentonite clay | 88 | none |
| 10% bentonite clay & 10% starch | 99 | partial |

EXAMPLE 2

Pelletized carbon products of the present invention were produced per the binder compositions in Table 2. All of the pelletized carbon products of the present invention summarized in Table 2 show high mechanical strength without the need for high temperature treatment or complex chemical processing. Table 2 shows that water resistance can also be achieved without high temperature heat treatment or complex chemical processing. The binder compositions of Table 2 reveal that attapulgite clay and lignosulfonate are superior to bentonite clay in achieving the desired water resistance.

TABLE 2

| Binder composition | BPH | Water Resistance |
|---|---|---|
| 10% bentonite clay & 10% starch | 99 | partial |
| 17% bentonite clay & 17% starch | 99 | yes |
| 10% attapulgite clay & 10% starch | 99 | yes |
| 10% lignosulfonate & 10% starch | 99 | yes |

EXAMPLE 3

Pelletized carbon products were produced per the binder compositions in Table 3. While the binder composition with only bentonite clay does not have any water resistance and has poor mechanical strength as a result of no high temperature heat treatment, the binder compositions employing starch have improved mechanical strength and water resistance. It is interesting to note that the binder composition with 20% starch was very brittle while wet and therefore only had partial water resistance. This binder composition created a lot of fines in the finished water. In contrast, the binder composition with 10% bentonite clay and 10% starch was observed to be "doughy" and therefore only had partial water resistance. However, it did not generate significant fines in the finished water, thus creating a binder composition superior to the other two in the example.

TABLE 3

| Binder composition | BPH | Water Resistance |
|---|---|---|
| 20% bentonite clay | 60 | none |
| 20% starch | 93 | partial |
| 10% bentonite clay & 10% starch | 99 | partial |

EXAMPLE 4

Pelletized carbon products of the present invention were produced per the binder compositions in Table 4. Due to the acidic character of the base carbon used in this example, the pelletized carbon product did not have any water resistance until the acidic nature of the carbon was neutralized. During production, the dry components were mixed with a sodium hydroxide solution of sufficient concentration to neutralize the acidic nature of the base carbon. In doing so, the finished carbon product has the necessary water resistance while maintaining high mechanical strength.

TABLE 4

| Binder composition | BPH | Water Resistance |
|---|---|---|
| Acidic carbon with 10% bentonite clay & 10% starch | 97 | none |
| Acidic carbon with 10% bentonite clay & 10% starch neutralized with sodium hydroxide solution | 98 | yes |

EXAMPLE 5

Pelletized carbon products of the present invention were produced per the binder compositions in Table 5. Silica solution is used to achieve high mechanical strength and water resistance in combination with starch and/or bentonite clay. The silica solution provides strength as a binder and also as a pH modifier to improve mechanical strength and water resistance. 20% bentonite clay alone did not have water resistance.

TABLE 5

| Binder composition | BPH | Water Resistance |
|---|---|---|
| 20% bentonite clay | 97 | none |
| 10% bentonite clay % 10% silica solution | 99 | partial |
| 10% starch & 10% silica solution | 99 | yes |
| 5% bentonite clay & 5% starch & 10% silica solution | 99 | yes |

EXAMPLE 6

Pelletized carbon products of the present invention were produced per the binder compositions in Table 6. Guar gum is used to achieve high mechanical strength and water resistance in combination with starch and/or bentonite clay and/or silica solution.

TABLE 6

| Binder composition | BPH | Water Resistance |
|---|---|---|
| 10% bentonite clay % 10% guar gum | 99 | yes |
| 5% bentonite clay & 5% guar gum & 10% silica solution | 99 | yes |
| 10% starch & 10% guar gum | 99 | yes |
| 10% silica & 10% guar gum | 99 | yes |

Figure 2:
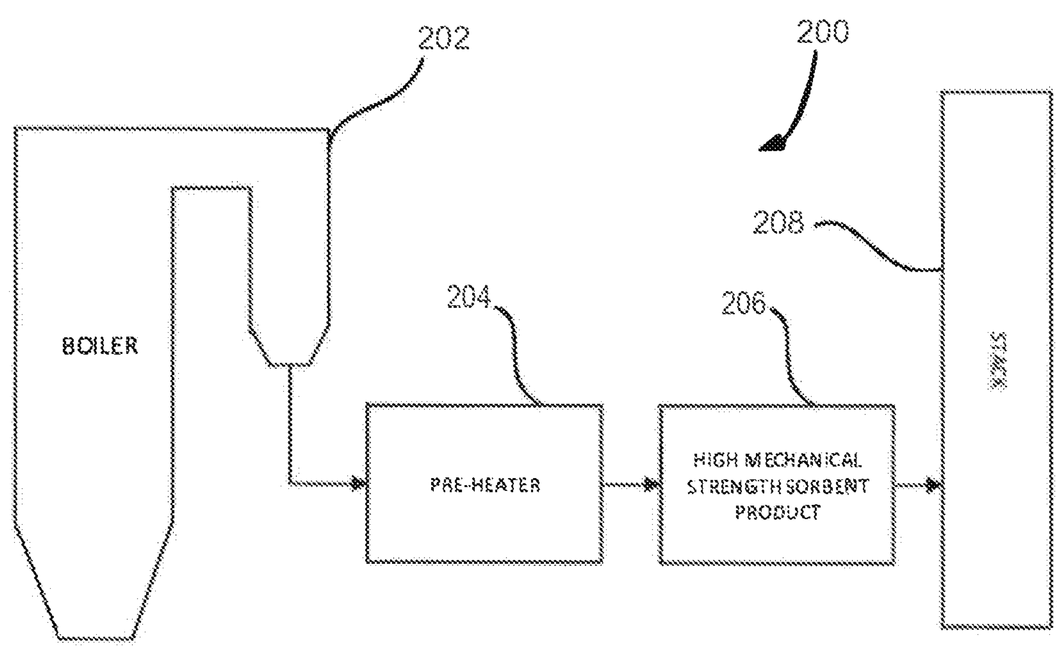
FIG. 2 is a schematic diagram depicting a system of the invention for controlling multiple contaminants or pollutants from a process gas stream.

Referring now to FIG. 2, a system for controlling multiple pollutants from process gas is illustrated in the schematic diagram according to another embodiment of the invention. The system 200 includes a source of process gas such as generated from a boiler 202 of a coal-fired power plant. More specifically, boiler 202 may represent a coal-fired boiler that burns coal to heat water into superheated steam for driving steam turbines that produce electricity.

The process gas or flue gas to be treated according to the system of the invention may originate however from many other industrial facilities such as a power plant, a cement plant, a waste incinerator, or others. Accordingly, the process gas to be treated is not limited to only those process gases generated by a coal-fired power plant. The contaminants that may be removed from the gas stream by treatment in the system of the invention include sulfur dioxide, sulfur trioxide, mercury, particulate matter, nitrogen oxides and others.

The process gas or flue gas is directed by piping/ductwork to a heat exchanger or pre-heater 204 where heat is transferred from the flue gas to a stream of air that is fed back into boiler 202. The flue gas is then transferred to a pollutant control unit 206 for removal of contaminants such as deSOx, deNOx, and/or Hg where the pollutants come into contact with the pelletized carbon products. After being treated in pollutant control unit 206, the treated flue gas may then be sent to a stack 208 for emission into the environment.

Figure 3:
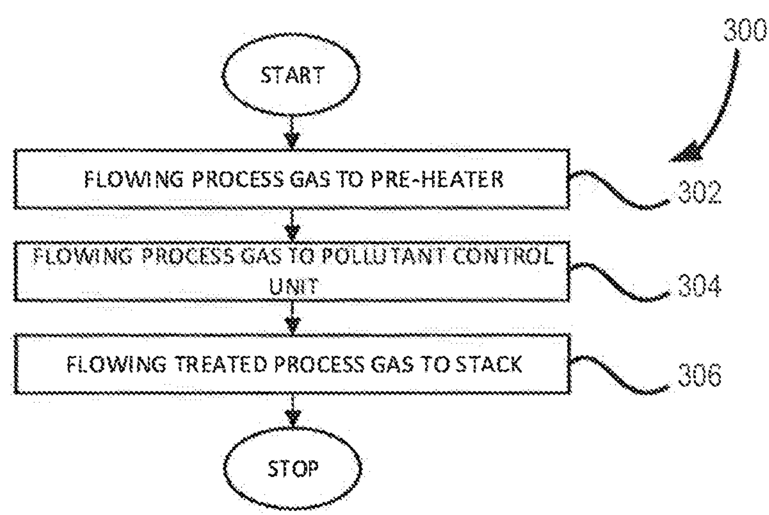
FIG. 3 is a schematic diagram depicting a method for controlling multiple contaminants or pollutants from a process gas stream.

Referring to FIG. 3, this schematic diagram shows a method 300 for simultaneously controlling contaminants such as deSOx and deNOx and/or Hg by removal in a flue gas or a process gas. According to the method 300, in step 302, the process or flue is transferred to a pre-heater for heat transfer to an air source that is fed back into the source or flue/process gas, such as a boiler 302. In step 304, the process or flue gas is transferred to a pollutant control unit 306 for simultaneous control of the contaminants deSOx and deNOx and/or Hg removal. This step includes contacting the process or flue gas with pelletized carbon products to remove deSOx and deNOx and/or Hg. This step may also include recycling nitrogen and sulfur compounds from the pelletized carbon products. In step 306 the treated process or flue gas may be transferred to a stack for emission into the environment.

While the invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A pelletized carbon composition, comprising:
an acidic powdered carbonaceous material;
an organic binder;
a secondary binder; and
a pH modifier including sodium hydroxide; and
water to neutralize acidity of the acidic powdered carbonaceous material enabling said organic binder and said secondary binder to form a water-resistant bond; and
wherein said composition has a Ball Pen Hardness (BPH) of at least 60.

2. The pelletized carbon composition of claim 1, wherein:
the organic binder is a soluble organic binder.

3. The pelletized carbon composition of claim 1, wherein:
the organic binder is starch.

4. The pelletized carbon composition of claim 1, wherein:
the secondary binder is a clay mineral.

5. The pelletized carbon composition of claim 1, wherein:
the secondary binder is attapulgite clay.

6. The pelletized carbon composition of claim 1, wherein:
the secondary binder is an organic polymer.

7. The pelletized carbon composition of claim 1, wherein:
the secondary binder is lignosulfonate.

8. The pelletized carbon composition of claim 1, wherein the secondary binder is guar gum.

9. The pelletized carbon composition of claim 1, wherein the secondary binder is silica.

10. The pelletized carbon composition of claim 1, wherein:
the organic binder comprises up to 20% of the composition.

11. The pelletized carbon composition of claim 1, wherein:
the secondary binder comprises up to 20% of the composition.

12. The pelletized carbon composition of claim 1, wherein the secondary binder is bentonite clay.

13. The pelletized carbon composition of claim 1, wherein the pelletized carbon composition is composed of up to 20% of the organic binder and up to 20% of the secondary binder.

14. The pelletized carbon composition of claim 1, wherein the organic binder is a soluble organic binder and the secondary binder is a clay mineral or organic polymer.

15. The pelletized carbon composition of claim 1, wherein the organic binder is starch and the composition is composed up to 20% the starch; and wherein the secondary binder is bentonite clay and the composition is composed up to 20% the bentonite clay.

16. The pelletized carbon composition of claim 1 wherein the organic binder is starch and the composition is composed of up to 20% the starch; and wherein the secondary binder is lignosulfonate and the composition is composed up to 20% the lignosulfonate.

17. The pelletized carbon composition of claim 1, wherein a final pelletized carbon product is water resistant.

18. A method of making pelletized carbon compositions, the method comprising:
mixing a powdered carbonaceous material, an organic binder, a secondary binder, a pH modifier including sodium hydroxide and water to form a mixture;
extruding the mixture into pelletized structures; and
drying the pelletized structures to form pelletized carbon compositions;
wherein said composition has a Ball Pen Hardness (BPH) of at least 60; and
wherein the water and the pH modifier neutralize acidity of the powdered carbonaceous material enabling said organic binder and said secondary binder to form a water-resistant bond.

19. The method of claim 18, wherein:
sufficient water is added to plasticize the mixture.

20. The method of claim 18 wherein the amount of the organic binder and the secondary binder is up to 20% of the compositions for each said binder.

21. The method of claim 18 wherein the drying step is conducted at temperatures up to 250° C.

22. The method of claim 18 wherein the drying step is conducted to dry the pelletized structures to below 2% moisture measured at 150° C.

23. The method of claim 18 wherein the method of making does not require high temperature treatment above 250° C. to produce water resistant pelletized carbon compositions.

24. The method of claim 18 further including:
submerging the pelletized carbon compositions in water for at least 24 hours and if said pelletized carbon compositions maintain their mechanical strength after said submersion, said pelletized carbon compositions are water resistant.

25. The method of claim 24 wherein said mechanical strength is measured by ASTM D3802 for the (BPH).

26. A pelletized carbon composition comprising:
a powdered carbonaceous material;
an organic binder;
a secondary binder;
sodium hydroxide and water; and
wherein said sodium hydroxide and said water neutralize acidity of said powdered carbonaceous material thereby enabling said organic binder and said secondary binder to form a water-resistant bond; and wherein said composition has a Ball Pen Hardness (BPH) of at least 60.

27. A system for removing contaminants from a process gas stream, said contaminants including sulfur oxides, nitrogen oxides, and/or mercury (Hg) the system comprising:

a source of the process gas stream;

a pollutant control unit containing a pelletized carbon composition comprising a powdered carbonaceous material, an organic binder, and a secondary binder.

28. The system as recited in claim 27, wherein the pollutant control unit includes a packed bed of the pelletized carbon composition for contacting the process gas stream.

29. A method for removing contaminants from a process gas stream, said contaminants including sulfur oxides, nitrogen oxides, and/or mercury (Hg) the method comprising:

providing a source of the process gas stream from an industrial unit including a boiler or incinerator;

providing a pollutant control unit containing a pelletized carbon composition comprising a powdered carbonaceous material, an organic binder, and a secondary binder; wherein the composition is treated with sodium hydroxide and water to neutralize acidity of said powdered carbonaceous material thereby enabling said organic binder and said secondary binder to form a water-resistant bond;

wherein said composition has a Ball Pen Hardness (BPH) of at least 60;

treating the process gas stream by contact with the pelletized carbon composition; and subsequently removing said contaminants from the process gas stream.

* * * * *